US005975273A

United States Patent [19]

Zwahlen et al.

[11] Patent Number: 5,975,273

[45] Date of Patent: Nov. 2, 1999

[54] PROCESS AND APPARATUS FOR SECURED LOADING AND DISPENSING OF BILLS

[75] Inventors: Fritz Zwahlen, Ammerzwil; Robert Brügger, Bern, both of Switzerland

[73] Assignee: Ascom Autelca AG, Gumligen, Switzerland

[21] Appl. No.: 08/894,597

[22] PCT Filed: Feb. 22, 1996

[86] PCT No.: PCT/CH96/00057

§ 371 Date: Aug. 22, 1997

§ 102(e) Date: Aug. 22, 1997

[87] PCT Pub. No.: WO96/26504

PCT Pub. Date: Aug. 29, 1996

[30] Foreign Application Priority Data

Feb. 24, 1995 [CH] Switzerland .......................... 539/95-1

[51] Int. Cl.[6] .............................. G07F 7/04; G06F 17/60; B65H 29/00

[52] U.S. Cl. ........................... 194/206; 235/379; 271/187

[58] Field of Search ............................. 235/379; 271/315, 271/187; 194/206, 207

[56] References Cited

U.S. PATENT DOCUMENTS

| | | | |
|---|---|---|---|
| 3,760,158 | 9/1973 | Whitehead et al. | 235/379 |
| 4,571,489 | 2/1986 | Watanabe | 235/379 |
| 5,000,322 | 3/1991 | Goi | 209/534 |

FOREIGN PATENT DOCUMENTS

| | | |
|---|---|---|
| 0211813 A2 | 2/1987 | European Pat. Off. . |
| 0317537 A2 | 5/1989 | European Pat. Off. . |
| 0409809 A1 | 1/1991 | European Pat. Off. . |
| 3237821 A2 | 5/1983 | Germany . |
| 3931571 A1 | 3/1991 | Germany . |
| 2071059 | 9/1981 | United Kingdom . |
| 2073926 | 10/1981 | United Kingdom . |

*Primary Examiner*—Dean J. Kramer
*Assistant Examiner*—Bryan J. Jaketic

[57] ABSTRACT

In the apparatus of the invention for loading and dispensing bills, the deposited bills are isolated and directly provisionally stored and tested by means of a deposit path (A, B, C), and the testing result, particularly with respect to the amount, is displayed. Depending on the customer's command and/or test result, the bills are returned after deposit from the intermediate storage (20) to the return path (E, F) that has one embranchment location (24*b*) only, so that the customer can personally test eventual or supposed inaccuracies in the automatic sum and/or value determination of the deposited bills. The bills can be guided into the end storage container by means of the only embranchment location (24*b*). A completely undisturbed bill loading system is therefore obtained, wherein the bills can be dispensed in the original order in which they were deposited for reverification by the depositing customer. In this manner, the greatest possible feeling of security is extended to the customer making the deposit.

24 Claims, 2 Drawing Sheets

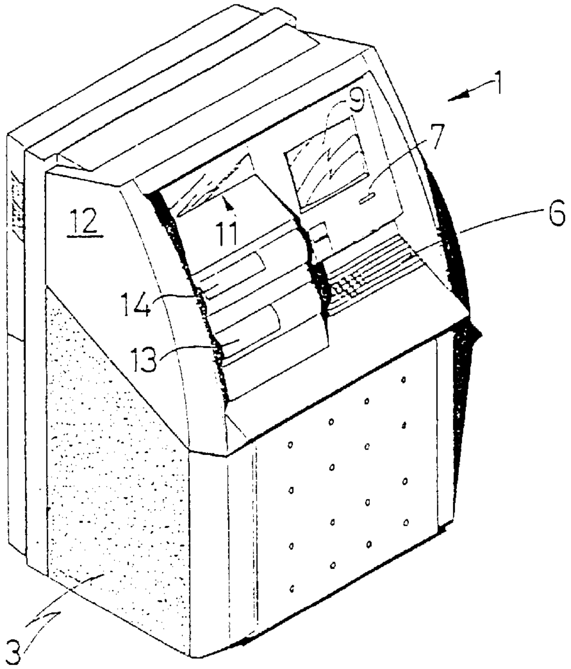
Fig. 1
Fig. 2
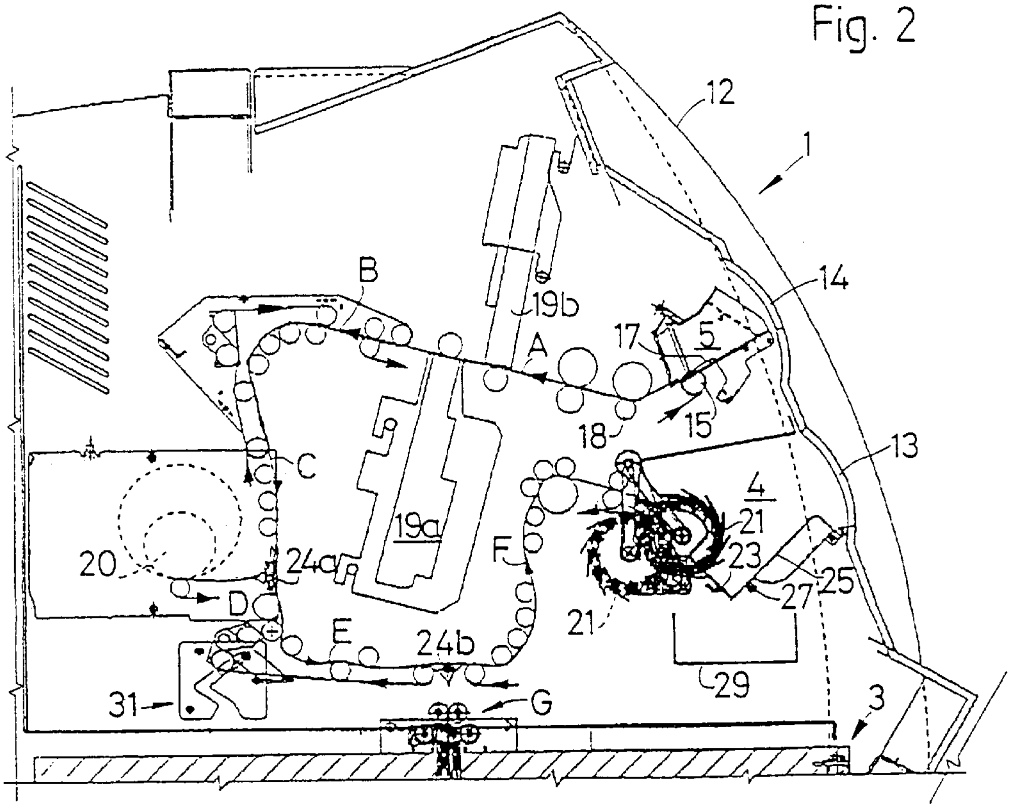

PROCESS AND APPARATUS FOR SECURED LOADING AND DISPENSING OF BILLS

FIELD OF THE INVENTION

The invention concerns a process and an apparatus for secured loading and dispensing of bills.

DESCRIPTION OF THE RELATED ART

Apparatus for loading and dispensing bills are known from GB-A 2,149,175, DE-U 9,314,342.7, EP-A 0,164,717, and GB-A 2,225,662.

In GB-A 2,225,662, for example, the inserted bills are tested individually for authenticity. Counterfeit or unrecognized bills are separated from genuine bills, and the genuine bills are arranged so that the upper side of each bill faces one and the same direction. The genuine arranged bills and the counterfeit, or not processed bills, are then gathered in separate loading containers. The bills that are gathered in separate containers are then again sent one by one to the deposit tray. From there, they can be removed or deposited into the different stack storage containers after separating them according to denomination.

A further bill loading and dispensing machine is known from EP-A 0,317,537. After loading the bills, the same are passed one by one through a bill feeding location and are then tested for authenticity in a testing unit. The genuine bills are fed over a first embranchment location as well as several other embranchments arranged on the different end storage containers and into an intermediate container. They remain there until bill loading has been completed.

The counterfeit or unrecognized bills are guided from the first embranchment location to a return redirecting, wherein the bills are redirected from a second embranchment location into the feeding unit for retesting.

If the complete transaction is interrupted by customers, all the bills of the intermediate container are transported back through the bill feeding location and thorugh the first and second embranchment locations into the feeding unit.

During a dispensing of bills from the end storage containers, the same are transported beyond the intermediate storage from a feeding location into the testing unit and are then loaded from a first and now-modified second embranchment unit into the dispensing tray.

Other procedures for loading and dispensing unrecognized bills are known from DE-A 3,931,571 and EP-A 0,409,809.

In DE-A 3,931 571, the bills are individually fed one after the other and transported into an intermediate storage by means of a bill transportation path. The bills are also passed through a bill testing unit, and the genuine bills are immediately made available for dispensing after testing. Bills found to be genuine are passed through the testing unit into the intermediate storage. These provisionally stored bills can be refed by means of the feeding path if requested externally. The simple structure of these loading and dispensing paths is only possible because an automatic isolation, bundling, etc. is eliminated.

A pivoting intermediate storage wherein the bills can be stored is described in EP-A 0,409,809. An isolation unit is not available. After turning it 90°, the provisionally stored bills can be fed into the end storage container and, after a 90° turn, a dispensing can be carried out by means of a staple wheel by bundling the dispensed bills into a dispensing unit.

SUMMARY OF THE INVENTION

The object of the invention is to obtain a flawless bill storage system with bill testing, wherein particularly the fed bills are available for dispensing to the depositing customers for a renewed control.

The known bill transportation systems are complicated and, therefore, have a tendency to a faulty distribution of the deposited bills. Particularly due to the bills deposited by the customers, it is not ensured that the apparatus disburses the same amounts which were previously fed and counted. This is experienced only if there is a questionable or actual discrepancy of the automatically determined fed value, and it can be requested that the bills fed into the apparatus be returned, whereby the loading and dispensing paths are structured in such a manner that there is an accurate certainty.

Before the final storing of the bills, the bill transportation path, as described below, is carried out with only one single bill at a time by means of a lead-through and guiding element up to the intermediate storage. Then, a further similar element is structured in a particularly uncomplicated manner in contrast with both elements in the function of the different embranchment locations of the known apparatus. This is done to eliminate the likelihood of bills being guided down the wrong path. A complaining customer can be shown these paths and, therefore, can be convinced that an erroneous manipulation of the bills in the bill path is not possible.

In a preferred embodiment, it is ensured that the customer cannot come into contact with any of the parts of the mechanical drive; on the one hand, to avoid injury and, on the other hand, to eliminate the possibility of damage to the parts of the mechanical drive. For this purpose, for example, the partitioned wheel that dispenses the bills is swiveled back into the dispensing tray before opening the closure flap in the hollow rear wall, and the wall opening is then closed.

BRIEF DESCRIPTION OF THE DRAWINGS

The examples of the apparatus of the invention are further explained in the following with reference to the drawings. Further advantages of the invention are obtained from the following description, wherein:

FIG. 1 is a perspective view of the apparatus of the invention;

FIG. 2 is a longitudinal section through the apparatus as seen in FIG. 1 with a simplified schematic representation of the bill transportation, lead-through, redirecting, and guiding paths, the intermediate storage, and the dispensing path;

DETAILED DESCRIPTION OF THE INVENTION

Figure 3:
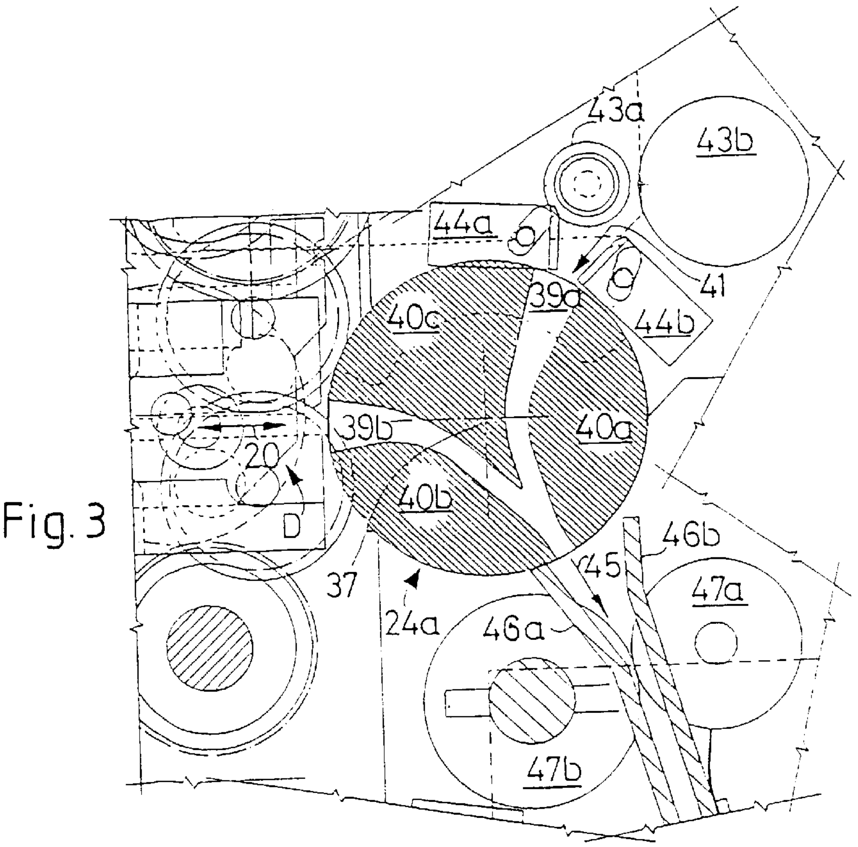
FIG. 3 is a cross-section of a bill lead-through, redirecting, and guiding element with the aid of which the bills can be transported into the intermediate storage, as well as out of the same, and into the corresponding bill transportation area.

The apparatus represented in FIG. 1 for a secure loading and dispensing of bills is conceived in such a manner that it can be operated by bank customers without the assistance of bank employees. It is particularly provided so that, after banking hours, businessmen can make deposits, the deposited amounts can be entered, a receipt can be printed, the bill amount can be securely stored, and the automatically determined amount can be credited into the customer's account. The recounting of the deposited amount at a later point in time by the bank personnel is unnecessary. If the bank customer has any doubts with respect to the accuracy of the amount in bills determined by the apparatus, he can request that the deposited bills be returned to him, count them again, and deposit them again or refrain from depositing altogether. The apparatus also tests the authenticity of the bills. Counterfeit or untested bills, clinging bills, etc. are dispensed into a dispensing tray 4.

The apparatus seen in FIG. 1 has an upper and lower part 1 and 3. The lower part 3 serves as an end storage container for the deposited bills. It is protected against unauthorized removal, and the bills can also be dispensed from there. Due to security reasons, the lower part 3 is surrounded by an armored wall and is firmly anchored within a space.

The upper part contains the control arrangements for the transportation and testing of the bills, the deposit and dispensing trays 4 and 5, a keypad 6 for data input, an insertion slit 7 for a means by which the bank customer (credit card) may be identified, and a screen 9 for the communication between the apparatus and the bank customer, as well as an output unit 11 for documents. The upper part 1 is provided with a front cover 12 that opens upward for maintenance purposes. It is possible for a bank employee to effect an opening of the front cover 12 when complying with the security provisions. The dispensing as well as the deposit trays 4 or 5 are each provided with a closure flap 13 or 14 that can be opened.

FIG. 2 shows a schematic longitudinal section through the upper part 1. The bill isolation arrangement 15 in the bottom 17 of the deposit tray 5, two bill testing arrangements 19*a* and 19*b*, an intermediate storage 20, and a swivel-away partitioned wheel 21 in the rear wall 23 of the dispensing tray 4 are provided in the upper part 1 for an organized loading of the bills to be dispensed into the dispensing tray 4, as well as a bill lead-through, redirecting, and guiding element 24*a* for guiding the bills into the intermediate storage 20 and again down and out of the same or beyond the intermediate storage, and a further bill lead-through, redirecting, and guiding element 24*b*.

The transportation path for the bills is divided into seven partial areas A to G, wherein not all of the partial areas have the same conveying speed for the bills. The partial areas A, B, C, E, and G represent a feeding path. The partial area F represents the return path.

The conveying speed in the first partial area A, which starts with the bill isolation 15 at the deposit tray 5, is set up in such a manner that the isolation operates flawlessly. Unimpaired authenticity testing and value recognition can be achieved by means of the bill testing arrangements 19*a* and 19*b* arranged on both sides of the transportation partial area A. A thickness measuring arrangement 18 is arranged in front of both bill testing arrangements 19*a* and 19*b*. It determines if folded bills have been deposited. It must be observed for authenticity testing that, in the apparatus of the invention, the bills are tested in the direction of the width, as opposed to the known apparatus. The bill testing arrangements 19*a* and 19*b* are arranged close together and facing each other, but they are not aligned. This unaligned arrangement prevents that the scattered light of one bill testing arrangement from altering the measuring results of the other bill testing arrangement. The transportation partial area B arranged after the transportation partial area A is shaped as a "waiting room" for the newly tested bills. The bill waiting therein is set in motion as soon as the evaluation unit (not shown) sends a signal reporting that the testing has been completed.

In the two following transportation partial areas C and D, the bill is then taken up by the transportation partial area B and deposited by means of the element 24*a* into the intermediate storage 20, which is structured as a roll storage (storage drum). The storage drums described in EP-A 0,182,137, for example, can be used as roll storage. The bills that were deposited into the deposit tray 5 and tested by means of the bill testing arrangements 19*a* and 19*b* are then stored ("rolled up") in an isolated condition in the intermediate storage 20. The diameter of the empty or full storage drum is indicated by the broken lines in FIG. 2.

Depending upon the layout of the arrangement, unreadable or counterfeit bills, as well as folded bills, can also be stored in the intermediate storage 20. The counterfeit or unreadable bills are then separated according to current legal regulations for storage procedures in the lower part by means of the switch 24*b* and are transported into the dispensing tray 4 by means of the partitioned wheel 21, or they may be stored separately in the lower part. As long as the legal regulations allow it, the bank customer then receives his bills in an order which corresponds to the order in which they were deposited. The same procedure can be utilized for folded bills.

In the embodiment represented herein, however, the folded and counterfeit bills and the bills that were not recognized by the bill testing arrangements 19*a*, 19*b*, and 18 are guided beyond the partial area E into an intermediate storage 20 as a consequence of a particular positioning of the elements 24*a*.

Since, however, in most countries, a dispensation of counterfeit bills is prohibited, the apparatus can be equipped in such a manner that the bills can be deposited in the lower part 3 in a separate storage (roll storage) that is not shown. From there, they can be dispensed to the respective bank customer by a bank employee for control purposes; here also, the dispensing is carried out in the pregiven order.

Aside from the authenticity testing, the bill testing arrangements 19*a* and 19*b* also carry out a value detection of the bills that pass along and they transmit the recognized denominations to a registration unit that is not shown. This registration unit registers the bill amount according to bill values and calculates a final sum. These values are displayed together with a distinguishing mark or with the address of the bank customer which is read from the identification (credit card) inserted in the insertion slit on the screen 9. It can be printed upon request by means of an output unit 11. A storage of the unrepresented roll storages in the lower part 3 is carried out according to the corresponding input command of the bank customer by means of the keypad 6.

If the bank customer thinks that the printed or displayed data does not coincide with the amount of the bills deposited in the deposit tray 5, he gives a dispensing command by means of the keypad 6. The bills stored in the intermediate storage 20 are now unrolled and guided through the partial area D, the modified element 24*a*, into the partial area E, and from there, they are carried by means of a correspondingly set element 24*b* and the partial area F to the dispensing tray 4. The transportation partial areas D and E have approximately the same transportation speed, while the transportation partial area F has a higher transportation speed. This higher conveying speed is needed to push the bills into the partitions of the rotating partitioned wheel 21. The partitioned wheel 21 is represented in FIG. 2 in a position wherein it is pivoted to the right and reaches into the dispensing tray 4. The closure flap 13 of the dispensing tray 4 is closed and locked. The bills deposited in the partitioned wheel 21 are deposited as an organized bundle on the floor of the dispensing tray 4 which has a flap 25. If all the bills present have been deposited into the dispensing tray 4, the partitioned wheel 21 is swiveled away to the left and out of the dispensing tray 4. After the partitioned wheel has been swiveled back, a wall opening (not shown) located in the rear wall 23 of the tray 4, which partially receives the partitioned wheel, is closed. After closure, the closure flap 13 of the dispensing tray 4 is unlocked. The bank customer can open the same and remove the bills. By means of swiveling away the partitioned wheel 21, any possibilities for injury to the customer during removal of the bills are eliminated, and there can also be no damage to the partitioned wheel 21 due to neglect.

If the bank customer forgets to remove the bills—the presence of the bills in the dispensing tray 4 is preferably detected by means of a bill sensor 27 (several sensors can also be used—then the flap 25 flaps down after a preset time interval, whereby the bills fall into a secured receiving container 29. The bills are then not accessible from the outside. If the bank customer later realizes his mistake, he can obtain these bills from a bank employee by providing proper identification. An identification is possible in the apparatus, since each bank customer must identify himself before using the apparatus by inserting a means of identification (for example, a credit card) into the insertion slit 7.

If the bank customer does agree with the amount of money automatically determined by the apparatus, he can type his agreement by means of the keypad 6, whereupon the element 24*b* is switched and the bills are separately and securely stored by the transportation partial D, E, and G in the lower part 3 according to bill value.

Several belt pairs are arranged one beside the other in the schematically represented transportation partial areas A to G. Each belt pair has two superposed belts for clamping the bills for transportation. The transportation partial areas A to G are arranged in such a manner that the belts can be separated from each other for maintenance purposes. The distance between belt pairs is sufficiently narrow so that folded bills can also be conveyed. If an intermediate storage of the folded bills is eliminated, and if the bills are then immediately transported into the dispensing tray 4 after testing, then a greater distance between the holding belts can be selected in the intermediate storage 20.

Since the belts are now pre-tensed for a flawless bill transportation, during separation, each second coordinated belt pair arrangement has a separating force. To avoid a flicking back of the structure groups during separating, the same are secured by means of double-effect handles 31, of which one is suggested in FIG. 2. When the handle 31 is opened, the structure group is movable only until the belts are relaxed. A final release and separation is only possible after a second opening event.

Figure 4:
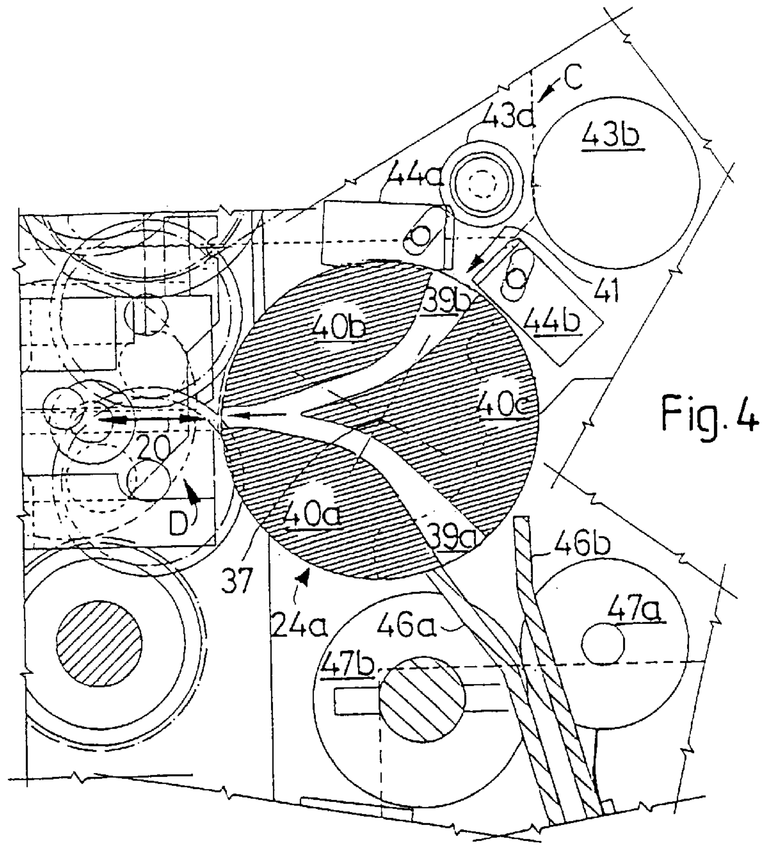
FIG. 4 shows the element as seen in FIG. 3 in a position wherein the bills can be guided from the feeding into the intermediate storage.

The path of the bills selected for remaining on the loading path (the lead-through), the redirecting of the loading path away from the intermediate storage 20, as well as the insertion of the bills called off from the intermediate storage into the loading path is carried out in FIGS. 3 and 4 by means of a represented bill lead-through, redirecting, and guiding element 24*a*. The element 24*a* is a circular cylinder rotatable around its longitudinal axis 37 by means of a drive (not shown). The circular cylinder is traversed by two axially running longitudinal slits 39*a* and 39*b*. The longitudinal slits 39*a* and 39*b* divide the circular cylinder and form three cylinder longitudinal pieces 40*a*, 40*b*, and 40*c*, which are mechanically held together on the cylinder bottom and/or top in a manner not shown.

The two longitudinal slits 39*a* and 39*b* are brought together at one point of the cylinder jacket and form a swinging V. The ends of the V-handle of the longitudinal slits 39*a* and 39*b* are widened to a funnel shape to provide a good inflow of the bills.

The element 24*a* is shown in FIG. 3 at a position wherein the bills coming from the transportation partial area C of the deposit in the direction of the deposit path, shown by means of the arrow with the reference number 41, are guided by the guide rolls 43*a* and 43*b* and additionally guided by means of the inflow aid elements 44*a* and 44*b* into the longitudinal slit 39*a*. Afterward, they leave by means of the loading path on the transport partial area E in the direction 45 toward the end storage containers or for dispensing. The guide of the transportation partial area E is carried out by means of arranged funnel-shaped guide sheets 46*a* and 46*b* and a conveyor belt, of which only the rolls 47*a* and 47*b* are shown. The bills are transported directly from the transportation partial area C to the transportation partial area E if the bills are determined to not correspond to regulations (counterfeit, unreadable, folded together, etc.) by the bill testing arrangements 19*a* and 19*b* as well as by the thickness measuring arrangement 18.

The element 24*a* is pivoted in such a manner toward the intermediate storage, that the funnel-shaped opening of the longitudinal slit 39*b*, as shown in FIG. 4, can receive bills coming from the transportation partial area C.

The bills are transported out of the intermediate storage 20 as shown in FIG. 3 by means of a transportation partial area D through the longitudinal slit 39*a* of the element 24*a* to the transportation partial area E.

The element 24*b* is shaped similarly to the element 24*a* and operates in the same manner.

Instead of the screen 9, a so-called touch screen can be used for communication between the apparatus and the bank customer. The keypad 6 cannot be eliminated, as a rule, since, for example, the input of the PIN number is very visible on the touch screen, while an input by means of the keypad can be better hidden optically.

The bills can be dispensed from the preferably used and not represented roll storages located in the lower part 3 by inputting the required value via the keypad 6 after the bank customer has been duly identified in the above-described manner. The dispensing is carried out into the dispensing tray 4 by means of the transportation partial areas G and F, as well as the switch 24*b* by means of the partitioned wheel 21. The revolving of the partitioned wheel 21 is carried out here in a similar manner as during the above-described dispensing of bills from the intermediate storage 20.

The apparatus of the invention must not only be used for the bank customer business; it can also be used in the bank internal areas, as well as generally in the money-processing area (supermarkets, commercial chains, post offices, etc.). Customer information can also be displayed on the screen 9 or the touch screen.

Containers can also be used instead of the roll storages in the lower part 3.

We claim:

1. A method for selectively receiving bills, comprising the steps of:

receiving a bill;

testing the received bill;

depending on a first result of said testing step, one of:

guiding the received bill to a temporary storage along a first guide path provided in a guiding element; and rejecting the received bill;

displaying a second result of said testing step;

receiving an input based on the displayed second result, whereby, in accordance with the input:

the received bill in the temporary storage is guided to a final storage along a second guide path provided in the guiding element, or the received bill is automatically returned.

2. The method according to claim 1, wherein said step of rejecting the received bill comprises one of seizing the rejected received bill and returning the rejected received bill.

3. The method according to claim 1, wherein said receiving step comprises receiving the bill along a first bill path and wherein the bill is returned along a second bill path different from the first bill path, depending on the input.

4. The method according to claim 1, wherein the first result is a determination that the received bill is one of counterfeit, unreadable, and folded.

5. The method according to claim 1, wherein the second result is a detected value of the received bill.

6. The method according to claim 3, wherein the received bill is conveyed at different speeds along the first and second bill paths, respectively.

7. The method according to claim 6, wherein the returned bill is ejected by a partitioned wheel.

8. The method according to claim 5, wherein the input is a customer input indicating agreement or disagreement with the displayed detected value of the received bill.

9. An apparatus for selectively receiving bills, comprising:

a bill inputting unit constructed and arranged to receive a bill;

a testing unit constructed and arranged to test at least one characteristic of said received bill;

a temporary storage;

a guiding element having first and second guide paths formed therein, and being constructed and arranged to, depending on a first result obtained from said testing unit, guide said received bill to said temporary storage along said first guide path, or reject said received bill;

an input/output interface constructed and arranged to display a second result obtained from said testing unit and to receive a control input;

a bill dispensing unit constructed and arranged to dispense a bill; and a final storage;

wherein said guiding element is further constructed and arranged to, in accordance with said control input, guide a received bill along said second guide path of said guiding element from said temporary storage to said final storage or return said received bill by way of said bill dispensing unit.

10. The apparatus according to claim 9, wherein said guiding element is constructed and arranged to reject said received bill depending on said first result by guiding said received bill to one of said bill dispensing unit and a bill retention unit.

11. The apparatus according to claim 9, wherein said first result is a determination that said received bill is or is not counterfeit, unreadable, or folded.

12. The apparatus according to claim 9, wherein said second result is a value of said received bill.

13. The apparatus according to claim 12, wherein said control input indicates agreement or disagreement with said second result.

14. The apparatus according to claim 9, wherein said testing unit comprises offset optical detectors for detecting a value of said received bill.

15. The apparatus according to claim 9, wherein said testing unit comprises a thickness detector for detecting whether said received bill is folded.

16. The apparatus according to claim 14, wherein said testing unit comprises a thickness detector for detecting whether said received bill is folded.

17. The apparatus according to claim 9, wherein said first and second guide paths coterminate within said guiding element.

18. The apparatus according to claim 17, wherein said guiding element is cylindrical.

19. The apparatus according to claim 18, wherein said guiding element is rotatably mounted so as to rotate about an axis thereof.

20. The apparatus according to claim 19, wherein said guiding element is rotatable between:

a first position wherein said coterminating ends of said first and second guide paths is aligned with said temporary storage, such that said first guide path is arranged so as to guide a received bill from said bill inputting unit to said temporary storage and said second guide path is arranged so as to guide a received bill from said temporary storage to said final storage or said bill dispensing unit; and a second position wherein said second guide path is arranged so as to guide a received bill from said bill inputting unit to said bill dispensing unit for rejecting said received bill.

21. The apparatus according to claim 9, wherein said temporary storage is a roll storage.

22. The apparatus according to claim 9, wherein said first and second guide paths in said guiding element are each continuous and without any branching.

23. The apparatus according to claim 9, comprising a bill tray located at an exterior side of said bill dispensing unit for holding a dispensed bill.

24. The apparatus according to claim 23, wherein said bill tray includes a sensor unit constructed and arranged to detect money left in the bill tray after a predetermined amount of time elapses.

* * * * *